(12) United States Patent
Kim

(10) Patent No.: US 6,459,890 B1
(45) Date of Patent: Oct. 1, 2002

(54) WATCH TYPE PORTABLE RADIOTELEPHONE

(75) Inventor: Jae Wook Kim, Taegu-Kwangyok (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/451,006

(22) Filed: Nov. 29, 1999

(30) Foreign Application Priority Data

| Nov. 27, 1998 | (KR) | 98-51323 |
| Nov. 28, 1998 | (KR) | 98-51619 |
| Nov. 28, 1998 | (KR) | 98-51626 |
| Mar. 29, 1999 | (KR) | 99-5032 |
| Sep. 22, 1999 | (KR) | 99-41177 |

(51) Int. Cl.[7] .................................. H04B 1/08
(52) U.S. Cl. .................. 455/351; 455/556; 455/525; 368/204
(58) Field of Search .................. 455/556, 563, 455/566, 568, 525, 90, 344–351; 379/428–430; 368/13, 203–204, 281

(56) References Cited

U.S. PATENT DOCUMENTS

| 5,008,864 | A | * | 4/1991 | Yoshitake | 368/10 |
| 5,737,412 | A | * | 4/1998 | Yamashita | 379/446 |
| 5,889,737 | A | * | 3/1999 | Alameh et al. | 368/204 |
| 5,960,366 | A | * | 9/1999 | Duwaer | 368/13 |
| 6,134,428 | A | * | 10/2000 | Nakazawa | 455/300 |
| 6,192,253 | B1 | * | 2/2001 | Charlier et al. | 455/340 |
| 6,212,414 | B1 | * | 4/2001 | Alameh et al. | 455/347 |
| 6,278,873 | B1 | * | 8/2001 | Itakura et al. | 455/351 |

FOREIGN PATENT DOCUMENTS

| WO | WO 9827702 | 6/1998 |

OTHER PUBLICATIONS

Japanese Abstract JP 9055679.

* cited by examiner

*Primary Examiner*—Daniel Hunter
*Assistant Examiner*—Pablo N. Tran
(74) *Attorney, Agent, or Firm*—Dilworth & Barrese, LLP

(57) ABSTRACT

A watch type portable radiotelephone is disclosed which includes a body element having upper and lower case frames, data input means, an LCD unit for outputting inputted data and displaying a variety of information, an antenna unit electrically connected to a receiver and a transmitter, a speaker unit, and a microphone unit. The radiotelephone also includes a holding part formed integrally with the lower case frame of the body element. The holding part at least partially defines a receiving space in which a battery pack for supplying power to the body element is able to be received. The holding part secures the battery pack to the body element. A locking projection for locking and unlocking the battery pack to and from the body element is formed on the battery pack. An electrically conductive connection assembly is provided for electrically connecting the body element and the battery pack with each other. A wrist band is connected to the body element for enabling the portable radiotelephone to be worn around the wrist.

22 Claims, 16 Drawing Sheets

WATCH TYPE PORTABLE RADIOTELEPHONE

BACKGROUND OF THE INVENTION

1. Field of the Invention

The present invention relates to a portable radiotelephone, and more particularly, the present invention relates to a watch type portable radiotelephone which can be worn around the wrist.

2. Description of the Related Art

Generally, portable radiotelephones include an HHP (hand-held programming device), a CT-2 (second generation cordless telephone), an analog type or digital type cellular phone, a personal communication system (PCS) phone, etc. Such portable radiotelephones perform a communication function while conducting radio communications with a base station.

Currently, development of such portable radiotelephones are kept in pace with the tendency of electronic elements to provide a high sensitivity, a compactness and a lightness. Portable radiotelephones can be classified, in terms of external construction, into a first generation having a bar type construction and a second generation having a flip type construction. The flip type portable radiotelephones and third generation folder type portable radiotelephones are widely used. In the future, the tendency toward the use of the folder type portable radiotelephones or portable terminals having a more compact construction will be increased.

A conventional bar type portable radiotelephone comprises a body element, an antenna unit which is installed at an upper end of the body element, an earpiece which is located below the antenna unit and includes a speaker, an LCD unit which is installed below the earpiece, a key pad which is located below the LCD unit and includes a multitude of number keys and function keys, and a microphone unit which is located below the key pad.

A conventional flip type portable radiotelephone (as disclosed in U.S. Pat. No. 5,629,979) includes a body element, a flip element, and a hinge unit for connecting the body element and the flip element with each other. In the conventional flip type portable radiotelephone, an antenna unit is installed at an upper end of the body element, an earpiece including a speaker is located below the antenna unit, an LCD unit is mounted below the earpiece, a key pad including a multitude of number keys and function keys is disposed below the LCD unit, and a microphone unit is mounted below the key pad. The microphone unit can be installed at the flip element, as occasion demands.

A conventional folder type portable radiotelephone (as disclosed in U.S. Pat. No. 5,628,089) includes a body element, a folder, and a hinge unit for rotating the folder at one end of the body element by an angle capable of rendering communication. In the conventional folder type portable radiotelephone, an antenna unit is installed at an upper end of the body element, a key pad including a multitude of number keys and function keys is disposed below the antenna unit, and a microphone unit is mounted below the key pad. An earpiece including a speaker is located at an upper end of the folder which is opened and closed by the hinge unit, and an LCD unit is mounted below the earpiece. At this time, the hinge unit which facilitates opening and closing of the folder with respect to the body element, performs a function of electrically as well as mechanically connecting the body element and the folder with each other.

Among the bar type, flip type and folder type portable radiotelephones, the flip type and the folder type portable radiotelephones provide excellent sound sensitivity levels and are used increasingly.

The use of flip type portable radiotelephones is currently increasing because the flip element coupled to the body element serves upon a standby mode to protect the multitude of keys provided on the body element and prevent erroneous operation of those keys. Moreover, in a talking mode, the flip element serves as a reflecting plate for concentrating sound during speaking to enhance the sound sensitivity level. In addition, the flip type construction is advantageous in terms of compactness of the body element in that the microphone unit can be installed on the flip cover.

Similarly to the flip type construction, the use of folder type portable radiotelephones is currently increasing because the folder coupled to the body element serves upon a standby mode to protect a key pad provided on the body element and prevent erroneous operations of the multitude of keys. Moreover, in a talking mode, the folder serves as a reflecting plate for concentrating sound during speaking to enhance the sound sensitivity level. In addition, the folder type construction is advantageous in terms of compactness of the body element in that the speaker unit and the LCD unit can be installed on the folder.

At this time, while the trend in portable radiotelephones is currently toward the miniaturization thereof, there exists a limit in miniaturizing portable radiotelephones because a minimum distance must be secured between the ear and the mouth of a user. In other words, in the case of the portable radiotelephone, a distance over 14 cm must be secured between a talking section (where a microphone is installed) and a hearing section (where an earpiece including a speaker is located) of the portable radiotelephone. Accordingly, the flip type or the folder type portable radiotelephones can only be miniaturized while maintaining an adequate total length.

Therefore, in the conventional bar type, flip type and folder type portable radiotelephones, strict limits are placed upon the miniaturization process. Hence, conventional portable radiotelephones suffer from defects in that portability thereof is deteriorated. Further, while it is the norm to carry a radiotelephone in a pocket, separate bag, or by hand, the likelihood that a radiotelephone become lost is remarkably increased. Also, if a radiotelephone is dropped due to careless handling or impacted, the radiotelephone is likely to be damaged and rendered useless.

Furthermore, conventional radiotelephones suffer from the problem of being unable to ensure waterproofness in a reliable manner.

SUMMARY OF THE INVENTION

Accordingly, the present invention has been made in an effort to solve the problems occurring in the related art, and a primary object of the present invention is to provide a watch type portable radiotelephone which is worn around the wrist, thereby improving portability.

Another object of the present invention is to provide a watch type portable radiotelephone which is advantageous in terms of miniaturization thereof.

Another object of the present invention is to provide a watch type portable radiotelephone which can be worn around the wrist, thereby minimizing the likelihood of it being dropped.

Another object of the present invention is to provide a watch type portable radiotelephone which has battery pack connection means for enabling a battery pack to be locked to and unlocked from a body element in a direction perpendicular to the body element.

Another object of the present invention is to provide a watch type portable radiotelephone which has battery pack connection means possessing waterproofing means.

Another object of the present invention is to provide a watch type portable radiotelephone which has battery pack connection means enabling a connection to be realized on a point basis (a point to point contact pattern).

Another object of the present invention is to provide a watch type portable radiotelephone which has a board assembly integrally assembled thereto.

Still another object of the present invention is to provide a watch type portable radiotelephone which has a sliding key input button possessing waterproofing means.

Yet still another object of the present invention is to provide a watch type portable radiotelephone which has a sliding key input button capable of being installed to a terminal and easily manipulated.

In order to achieve the above objects, according to the present invention, there is provided a portable radiotelephone including a body element having upper and lower case frames. The body element has data input means, an LCD unit outputting inputted data and displaying a variety of information, an antenna unit electrically connected to a receiver and a transmitter, a speaker unit, and a microphone unit. Holding means are formed integrally with the lower case frame of the body element. The holding means includes a receiving space in which a battery pack for supplying power to the body element can be received. The holding means secures the battery pack to the body element when the battery pack is locked to the body element. Locking means are provided for locking and unlocking the battery pack to and from the body element in a direction perpendicular to a plane of the body element. Connection means are provided for electrically connecting the body element and the battery pack to each other and a wristband is connected to the body element for enabling the portable radiotelephone to be worn around the wrist.

BRIEF DESCRIPTION OF THE DRAWINGS

The above objects and advantages of the presently disclosed watch type portable radiotelephone will become more apparent by describing in detail preferred embodiments thereof with reference to the attached drawings in which.

DETAILED DESCRIPTION OF PREFERRED EMBODIMENTS

Figure 1:
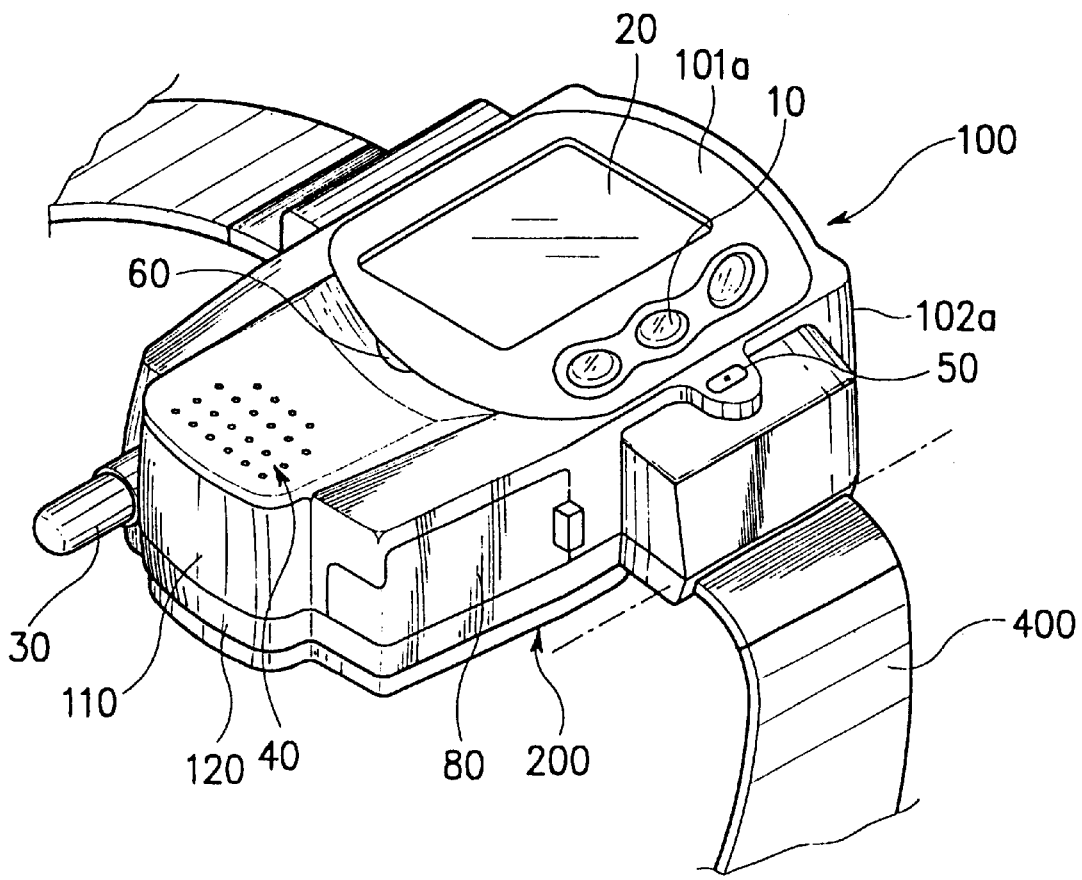
FIG. 1 is a perspective view of one embodiment of the presently disclosed watch type portable radiotelephone.

Reference will now be made in greater detail to the preferred embodiments of the presently disclosed watch type portable radiotelephone, wherein like reference numerals designate identical or corresponding elements in each of the several views.

FIG. 1 is a perspective view of a watch type portable radiotelephone in accordance with a preferred embodiment of the present invention. The watch type portable radiotelephone is largely divided into four sections. That is, the watch type portable radiotelephone comprises a body element 100, a battery pack 200 which is locked to a lower surface of body element 100 for supplying power to body element 100, locking means 300 (see FIG. 3) for enabling battery pack 200 to be locked to and unlocked from body element 100 in a direction which is perpendicular to a plane of body element 100, and a wrist band 400 which is connected to body element 100 for enabling the watch type portable radiotelephone to be worn around the wrist. In addition, the watch type portable radiotelephone further includes holding means 500 (see FIG. 3) for securing battery pack 200 to body element 100 when battery pack 200 is locked to a lower case frame 120 of body element 100.

The watch type portable radiotelephone is structured in a manner such that battery pack 200 is locked to and unlocked from the lower surface of body element 100 in a vertical direction, and has separate connection means for allowing power of battery pack 200 to be supplied to an RF board assembly 70 (see FIG. 6) of body element 100 when battery pack 200 is locked to body element 100.

Body element 100 includes an upper case frame 110 and a lower case frame 120. Upper and lower case frames 110 and 120 are coupled to each other by screws. Alternately, other known fastening devices can be used to secure the upper and lower frames together. An RF board, a voice recognition unit, a frequency modulating unit, an RF module, a receiver and a transmitter are disposed in body element 100 and are not shown in the drawings.

Body element 100 has data input means and data output means. While it is preferred that the data input means comprises at least one key 10, it is not necessary to limit the data input means to at least one key 10. For example, it is possible to input data using the voice recognition unit.

When data is inputted by manipulating the key 10 and/or by using the voice recognition unit, a variety of information is displayed on the data output means. It is preferred that the data output means include an LCD unit 20. By operating the data input means, data including, for example, an antenna bar which indicates signal reception sensitivity of an antenna unit, a battery capacity bar which indicates residual capacity of the battery pack 200, icons, etc. are displayed on the LCD unit 20. The data input means includes waterproofing means (not shown) for preventing failure of data input due to inflow of water from outside circumstances.

Keys are disposed on a top end 101*a* and a side end 102*a* of body element 100. It is preferred that a scroll key and a direction key are disposed on top end 101*a* of body element 100, and a function side key (not shown) is disposed on side end 102*a* of body element 100.

An antenna unit 30 which is electrically connected to the receiver (not shown) and the transmitter (not shown) is disposed in body element 100. A speaker unit 40 which is electrically connected to the receiver and a microphone unit 50 which is electrically connected to the transmitter are also disposed in body element 100. In addition, a telephone signal reception indicator lamp 60 is provided at a center portion of body element 100 to allow a user to easily confirm the reception of a telephone signal. Body element 100 has an interface connector cover 80 for protecting an interface connector which is installed to the RF board. The interface connector cover 80 is preferably constructed from rubber, although other materials may also be used.

Figure 2:
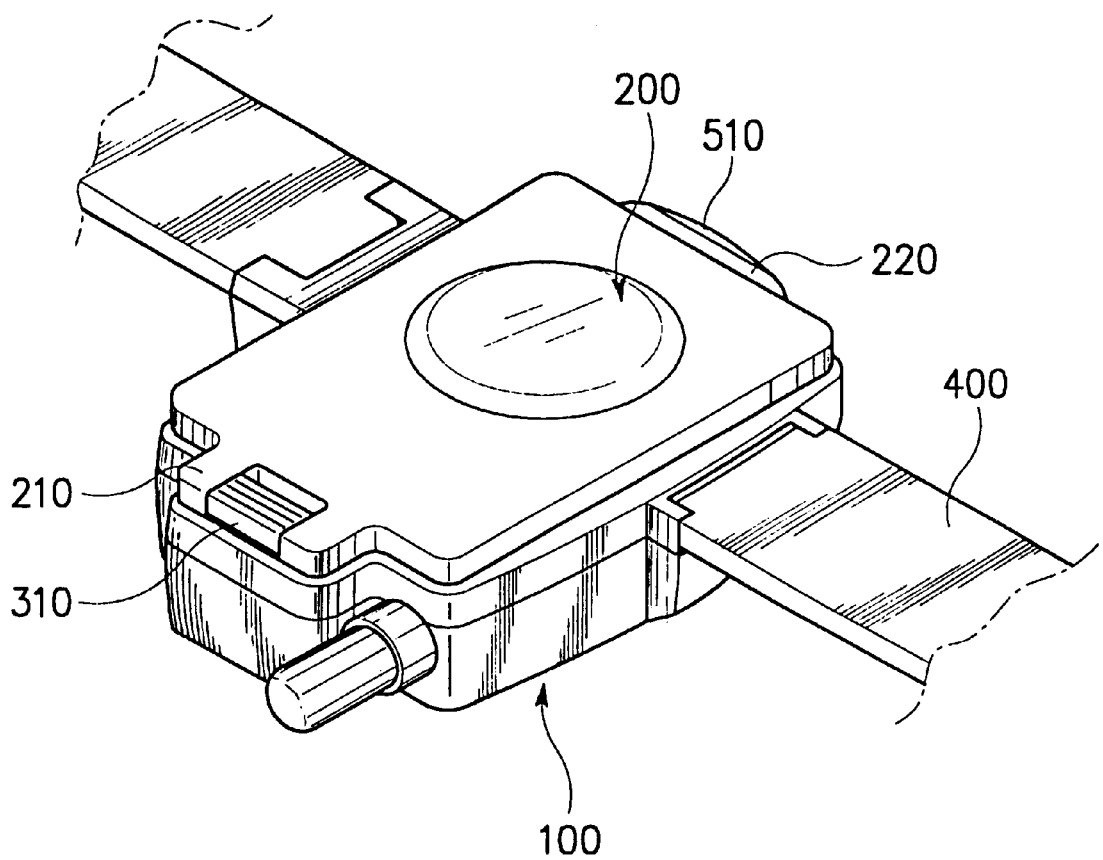
FIG. 2 is a bottom perspective view of the watch type portable radiotelephone shown in FIG. 1.
Figure 3:
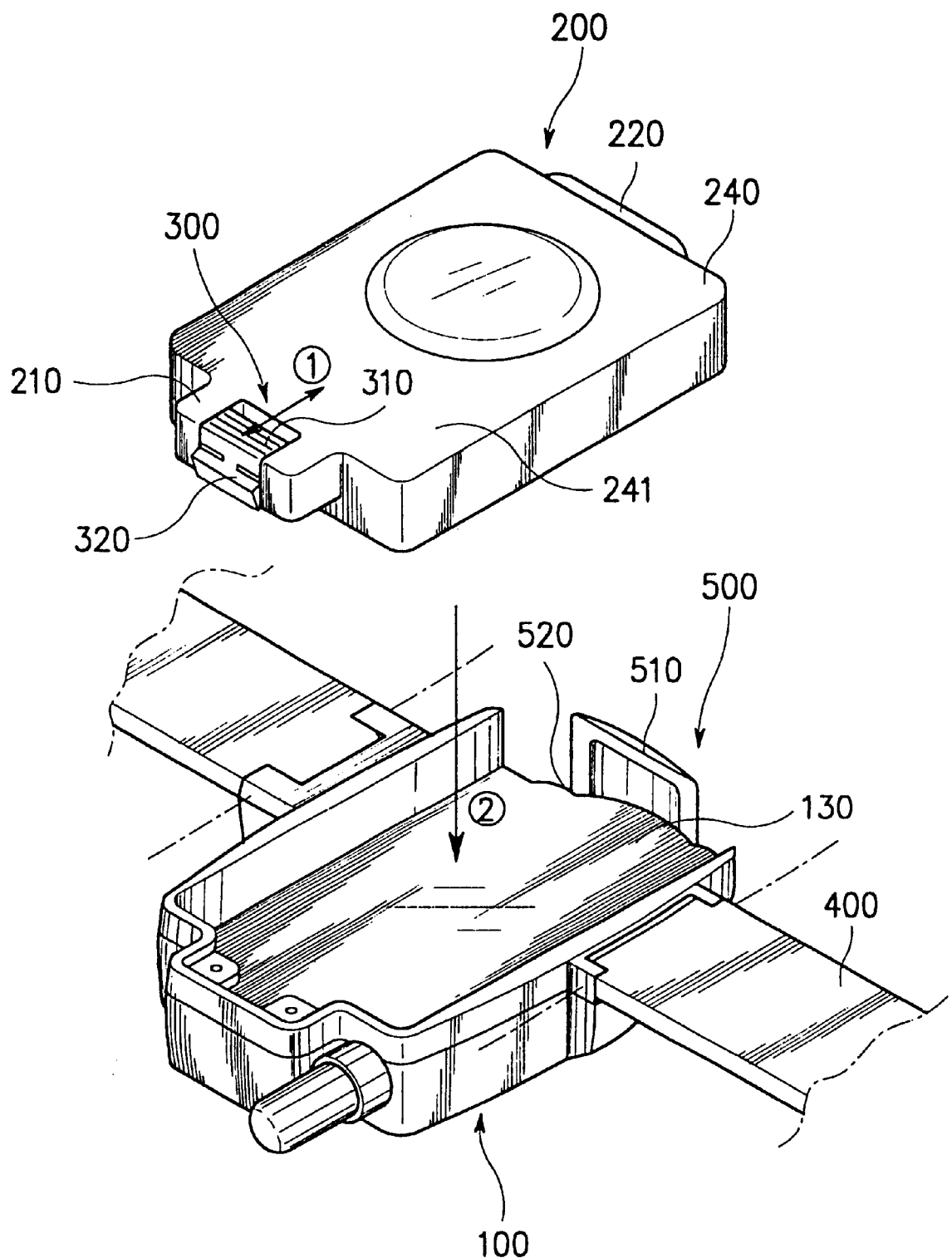
FIG. 3 is a perspective view of the watch type portable radiotelephone shown in FIG. 1, illustrating a state wherein a battery pack is unlocked from the body element.

Referring to FIGS. 2 and 3, the watch type portable radiotelephone according to the present invention includes locking means 300 which enables battery pack 200 to be locked to and unlocked from lower case frame 120 of body element 100 in a direction which is perpendicular to the plane of body element 100. Holding means 500 secures battery pack 200 to body element 100 when battery pack 200 is locked to lower case frame 120 of body element 100.

Locking means 300 includes a locker 310 which has a locking projection 320, a coil spring (not shown) which supports the locker 310, and a locking hole into which the locking projection 320 of the locker 310 is inserted as the locker 310 is moved. The coil spring and the locking hole are not shown in the drawings.

Holding means 500 for allowing battery pack 200 to be maintained in a locked state, includes a receiving space 130 in which the battery pack 200 is received, and a holding part 510 which grasps one end 240 of the battery pack 200 after battery pack 200 is received in receiving space 130. Receiving space 130 has a contour which corresponds to the configuration of battery pack 200. Holding part 510 has a recess 520 defined therein. In FIG. 3, arrow ① indicates the direction in which locker 310 is moved to position projection 320 of locker 310 in the locking hole, and arrow ② indicates the direction in which battery pack 200 is moved to position battery pack 200 into receiving space 130 of lower case frame 120 of body element 100.

To secure battery pack 200 in receiving space 130, end 240 of battery pack 200 is first secured in place by holding means 500, and end 241 of battery pack 200 is subsequently forcibly pressed, to lock battery pack 200 to lower case frame 120 of body element 100 by locker 310.

Figure 4:
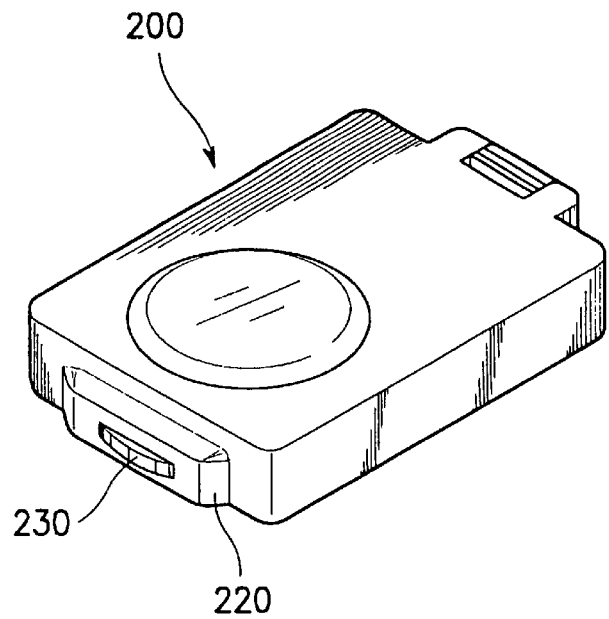
FIG. 4 is a perspective view of the battery pack in accordance with a preferred embodiment of the present invention.
Figure 5:
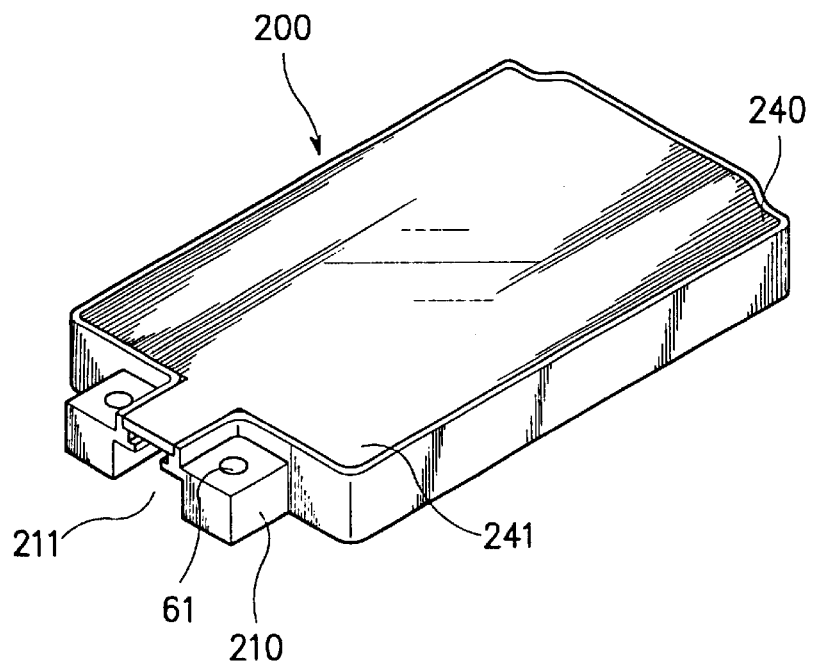
FIG. 5 is a bottom perspective view of the battery pack in accordance with a preferred embodiment of the present invention.

Referring to FIGS. 4 and 5, a first projecting part 220 is formed on end 240 of battery pack 200, and a holding projection 230 is formed on first projecting part 220. When battery pack 200 is received in receiving space 130, holding projection 230 is inserted into recess 520 (see FIG. 3) and end 240 of battery pack 200 is grasped by holding part 510.

The presently disclosed watch type portable radiotelephone provides advantages in that since it can be worn around the wrist of the user, excellent portability is accomplished. Also, since battery pack 200 is constructed in a manner such that it can be locked to and unlocked from the lower surface of body element 100 by locking means 300 and holding means 500, it is possible to repeatedly recharge battery pack 200 whenever necessary, whereby user convenience is ensured.

A pair of second projecting parts 210 are formed at end 241 of battery pack 200 such that they are opposite to each other and define a slot 211 in which the locker 310 is received. A connection section which is connected to a battery cell, is provided in each of the pair of second projecting parts 210. Alternately, a battery pack having a configuration other than that illustrated can be used. For example, a can-shaped battery cell can be used.

Among structural components of each connection section, only a battery contact 61 is exposed to the outside.

Figure 6:
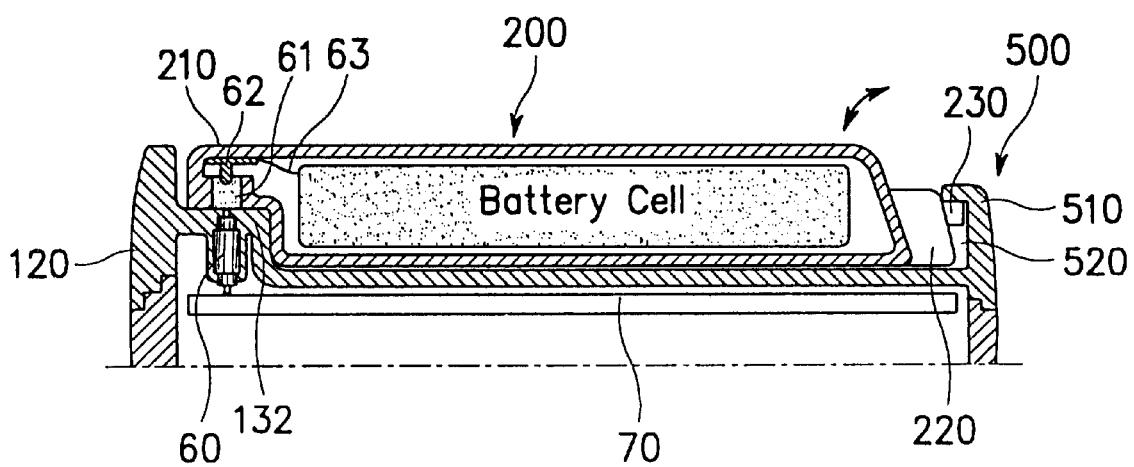
FIG. 6 is a cross-sectional view illustrating the battery pack locked to a lower case frame.

Referring to FIG. 6, battery pack 200 is secured in a locked state to lower case frame 120 of body element 100. Battery pack 200 is shown connected to RF board assembly 70 of body element 100.

As discussed above, after battery pack 200 is received in receiving space 130 of lower case frame 120 of body element 100 through holding means 500, battery pack 200 is locked to body element 100 by locking means 300. At the same time when battery pack 200 is secured in the locked state, battery pack 200 is connected with RF board assembly 70 of body element 100. The battery pack connection means functions to electrically connect the battery cell and the RF board assembly 70 with each other. Because battery pack 200 is locked to and unlocked from lower case frame 120 of body element 100 in the vertical direction, structural components of battery pack 200 are also mounted in the vertical direction.

The battery pack connection means of the present invention comprises a first connection section and a second connection section. In this respect, while a pair of battery pack connection means are actually provided for electrically connecting the battery cell and RF board assembly 70 with each other, only one battery pack connection will be described in detail herein. However, persons skilled in the art will appreciate that the watch type portable radiotelephone includes a pair of first connection sections and a pair of second connection sections. Each first connection section is supported by lower case frame 120, and each second connection section is mounted to the battery pack 200.

The first connection section includes a battery contact spring assembly 60 which contacts RF board assembly 70. Battery contact spring assembly 60 is interference fit into a first fixing section of lower case frame 120. The first fixing section is constructed to be waterproof.

The second connection section includes a battery contact 61 (FIGS. 8A and 8B) which is brought into point to point contact with battery contact spring assembly 60, and a battery contact tail 62 (FIG. 9) which is always in point to point contact with battery contact 61. Battery contact tail 62 and the battery cell are electrically connected with each other via a first flexible printed circuit 63.

The second connection section has a second fixing section which is formed on second projecting part 210 of battery pack 200. The second fixing section is also constructed to be waterproof.

Figure 7A:
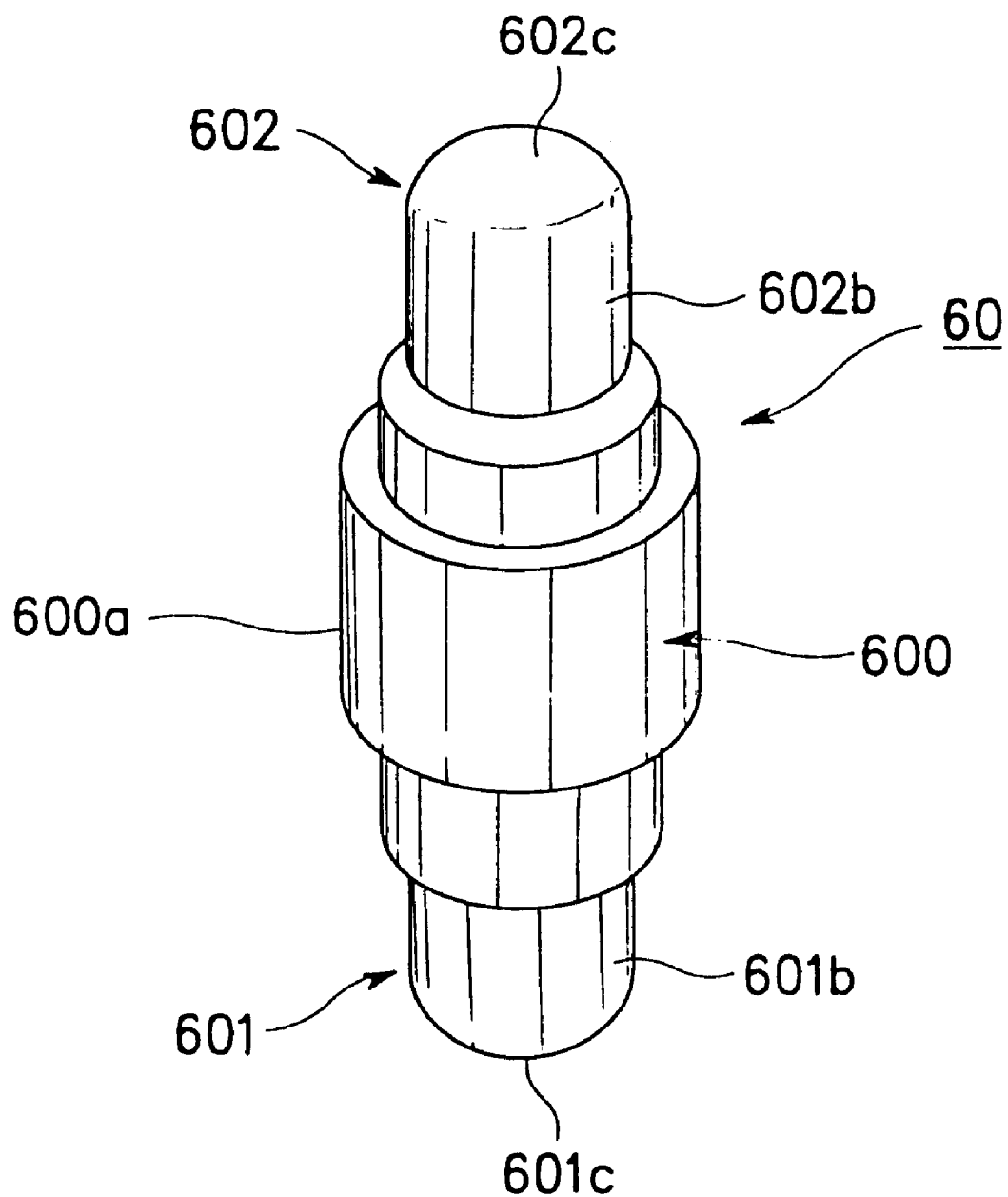
FIG. 7a is a perspective view illustrating a battery contact spring assembly in accordance with a preferred embodiment of the present invention.
Figure 7B:
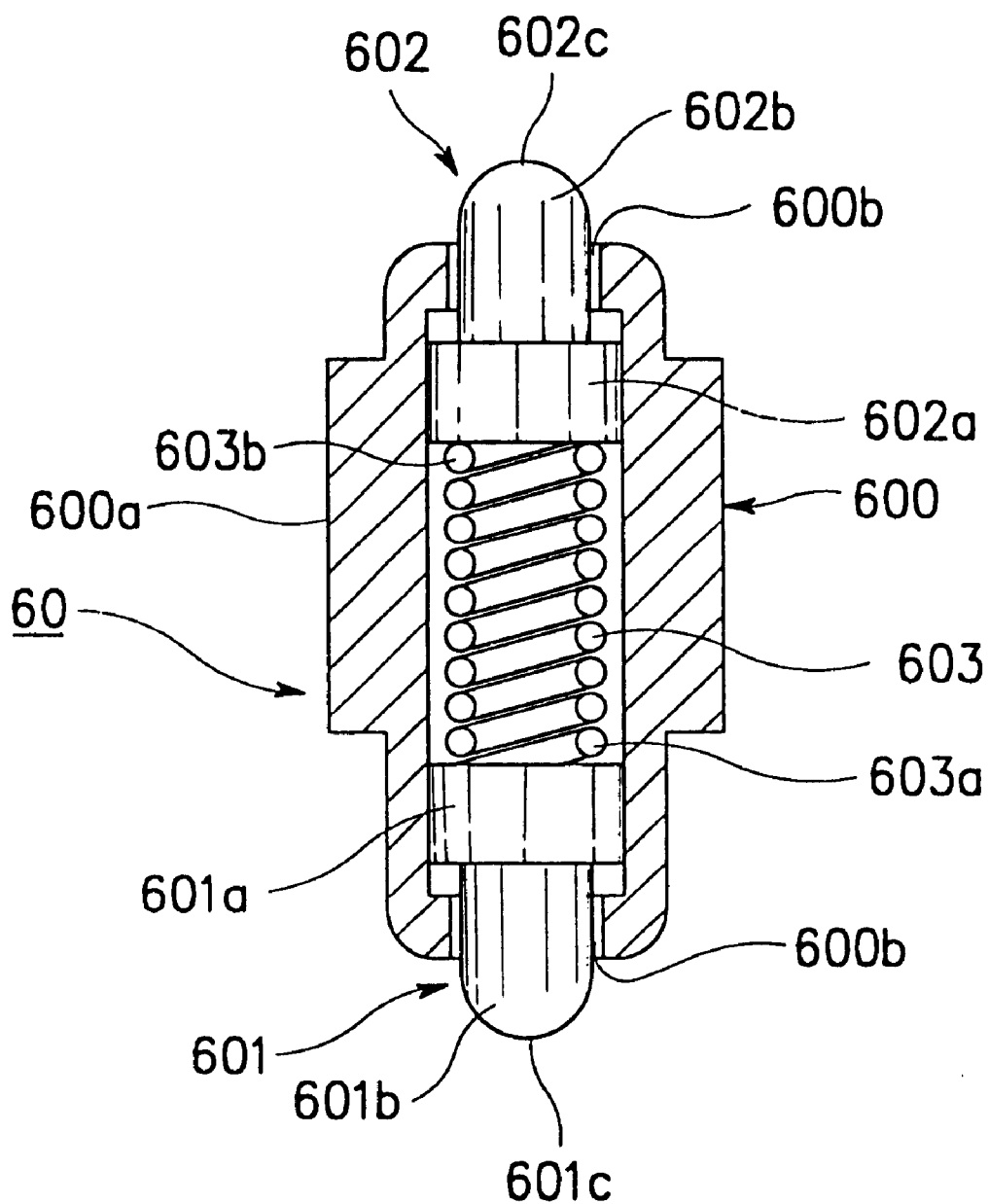
FIG. 7b is a cross-sectional view illustrating the battery contact spring assembly shown in FIG. 7A.

Referring to FIGS. 7A and 7B, battery contact spring assembly 60 includes a metal housing 600, a pair of metal connection terminals 601 and 602 which are disposed at each end of metal housing 600, respectively, and a compression coil spring 603 which is positioned between metal connection terminals 601 and 602. Housing 600, metal connection terminals 601 and 602, and compression coil spring 603 are conductive.

Housing 600 has a central fixing part 600*a* having a large diameter. Each end 600*b* of housing 600 defines an opening. The outer end of each metal connection terminal 601 and 602 projects through one of the openings formed in ends 600*b* of housing 600.

Metal connection terminals 601 and 602 are disposed in metal housing 600 in such a manner to allow reciprocation therein. Each of connection terminals 601 and 602 has an annular flange part 601*a* and 602*a* formed about an inner end thereof. The flange parts limit to some extent outward movement of metal connection terminals 601 and 602. Each of metal connection terminals 601 and 602 have a cylindrical part 601*b* and 602*b*, respectively. Free ends 601*c* and 602*c* of cylindrical part 601*b* and 602*b* serve as contact points. Metal connection terminals 601 and 602 are biased by compression coil spring 603 in a direction away from each other. Because compression coil spring 603 is conductive, metal connection terminals 601 and 602 are electrically connected to each other. End 603*a* of compression coil spring 603 is brought into close contact with metal connection terminal 601 and end 603*b* of compression coil spring 603 is brought into close contact with metal connection terminal 602.

Figure 8A:
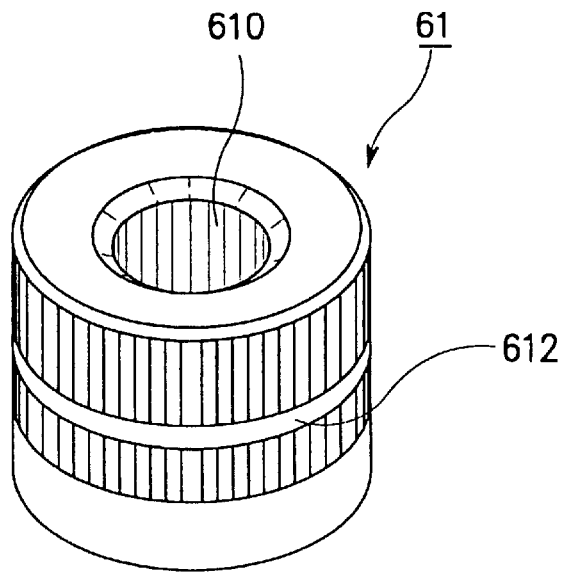
FIG. 8a is a perspective view illustrating a battery contact in accordance with a preferred embodiment of the present invention.
Figure 8B:
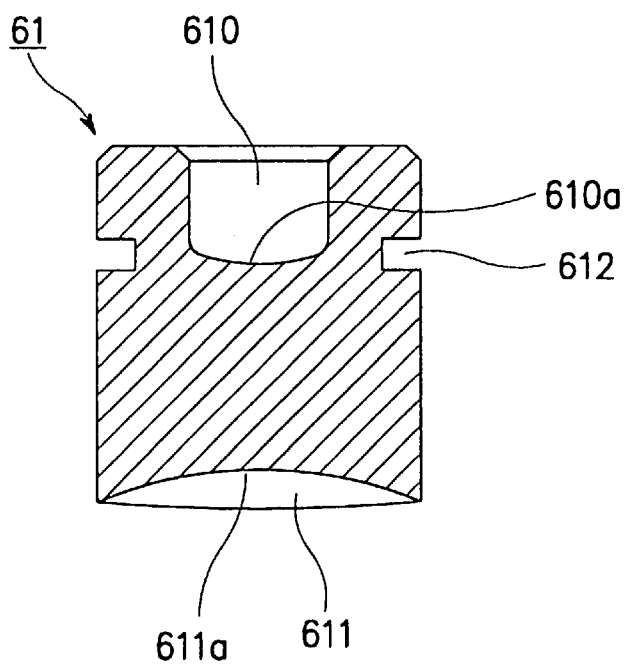
FIG. 8b is a cross-sectional view illustrating an inner structure of the battery contact shown in FIG. 8a in accordance with a preferred embodiment of the present invention.

Referring to FIGS. 8A and 8B, battery contact 61 has an insertion groove 610 having a predetermined depth formed at one end thereof, and a recess 611 formed at the other end thereof. A circumferential fixing groove 612 is formed about a central portion of battery contact 61. Battery contact tail 62 is configured to be inserted into insertion groove 610 of battery contact 61, and battery contact spring assembly 60 is positioned in recess 611 of battery contact 61. Battery contact tail 62 is brought into point to point contact with a bottom surface 610*a* of insertion groove 610, and free end 602*c* of metal connection terminal 602 of battery contact spring assembly 60 is brought into point to point contact with bottom surface 611*a* of recess 611.

Figure 9:
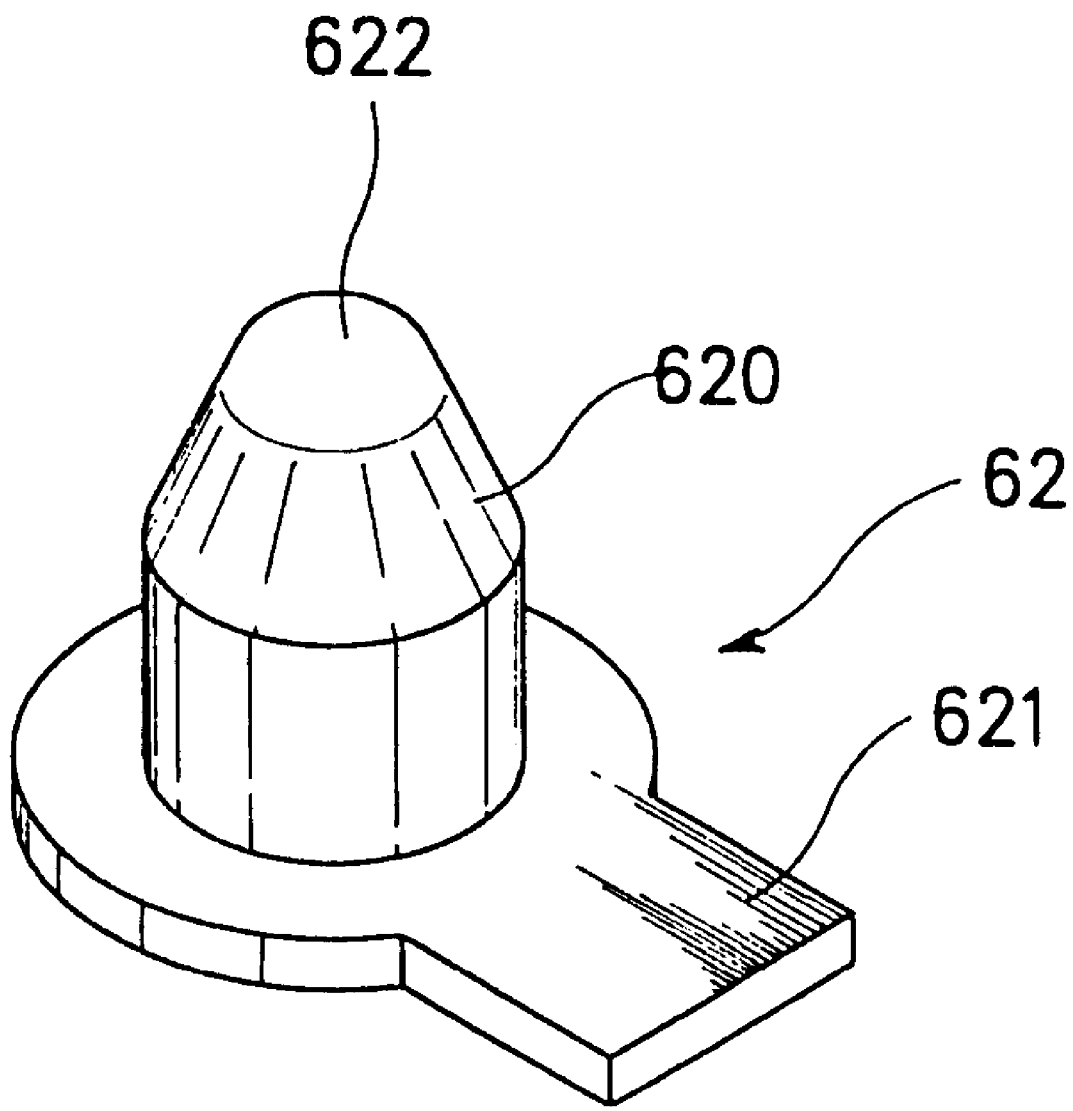
FIG. 9 is a perspective view illustrating a battery contact tail in accordance with a preferred embodiment of the present invention.

Referring to FIG. 9, battery contact tail 62 has a frusto-conical part 620 which is inserted into insertion groove 610 of battery contact 61 and an extended part 621 which extends toward the battery cell. Free end 622 of battery contact tail 62 is brought into point to point contact with bottom surface 610*a* of insertion groove 610. Battery contact tail 62 is electrically connected with the battery cell via flexible printed circuit 63.

Figure 10:
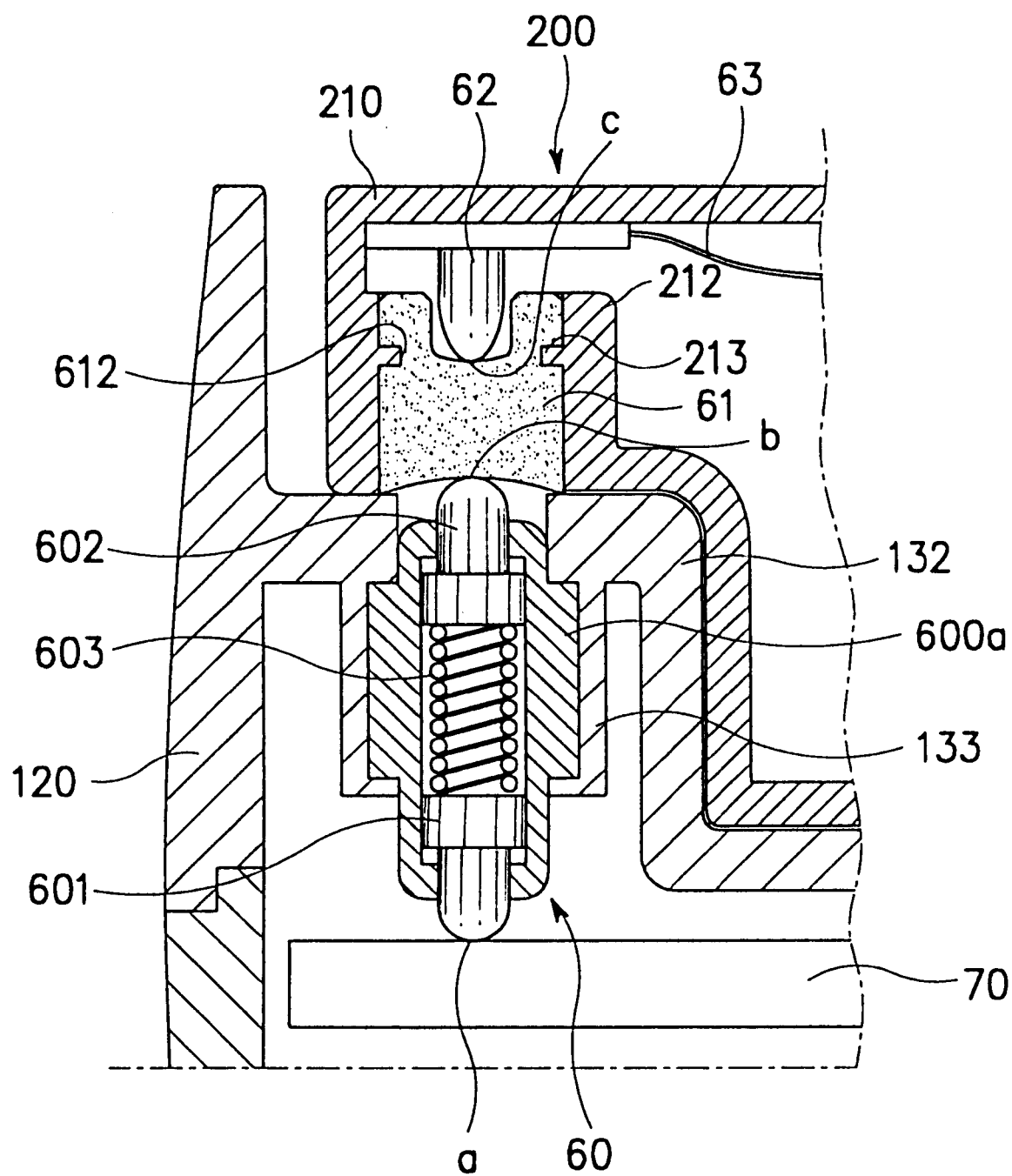
FIG. 10 is a partial cross-sectional view illustrating the battery pack locked to the body element in accordance with a preferred embodiment of the present invention.

Referring to FIG. 10, battery contact spring assembly 60 is mounted to a stepped part 132 of lower case frame 120 by the first fixing section. The first fixing section includes a first fixing rib 133 which extends downwardly to enable battery contact spring assembly 60 to be fitted therein in an upright posture. Battery contact spring assembly 60 is interference fit into first fixing rib 133. First fixing rib 133 surrounds fixing part 600*a* of metal housing 600. Because the contact area between a circumferential outer surface of fixing part 600*a* of metal housing 600 of battery contact spring assembly 60 and a circumferential inner surface of first fixing rib 133 is large, waterproofing is automatically obtained. In other words, as described above, the first fixing section for the battery contact spring assembly 60 is constructed to be waterproof.

The second connection section, which is defined by second fixing rib 212, receives battery contact 61 and battery contact tail 62. Battery contact 61 is interference fit into second fixing rib 212 to form a waterproof structure.

Circumferential fixing groove 612 of battery contact 61 is dimensioned to receive circumferential fixing protrusion 213 which projects from a circumferential inner surface of second fixing rib 212. Due to the fact that circumferential fixing protrusion 213 is interference fit into circumferential fixing groove 612, battery contact 61 is mounted to second fixing rib 212 in a watertight manner and thus, inflow of water into battery pack 200 is prevented. Moreover, the free end of battery contact tail 62 is brought into point to point contact with bottom surface 610*a* of insertion groove 610 of battery contact 61. Battery contact tail 62 is electrically connected with the battery cell via flexible printed circuit 63.

The connection path leading from the battery cell to RF board assembly 70 after battery pack 200 is locked to lower case frame 120 of body element 100 is as follows: the battery cell, flexible printed circuit 63, battery contact tail 62, battery contact 61, metal connection terminal 602, compression coil spring 603, metal connection terminal 601, and RF board assembly 70. Reference symbols a, b and c depicts contact points.

In the present invention, due to the fact that battery pack 200 is locked to body element 100 by moving the battery pack in a vertical direction and because the connection means also operates in the vertical direction when battery pack 200 is locked to body element 100, a stable connection is provided.

While it is explained that the connection means are provided at two points, the connection means according to the present invention can be disposed at positions more than two.

Figure 11:
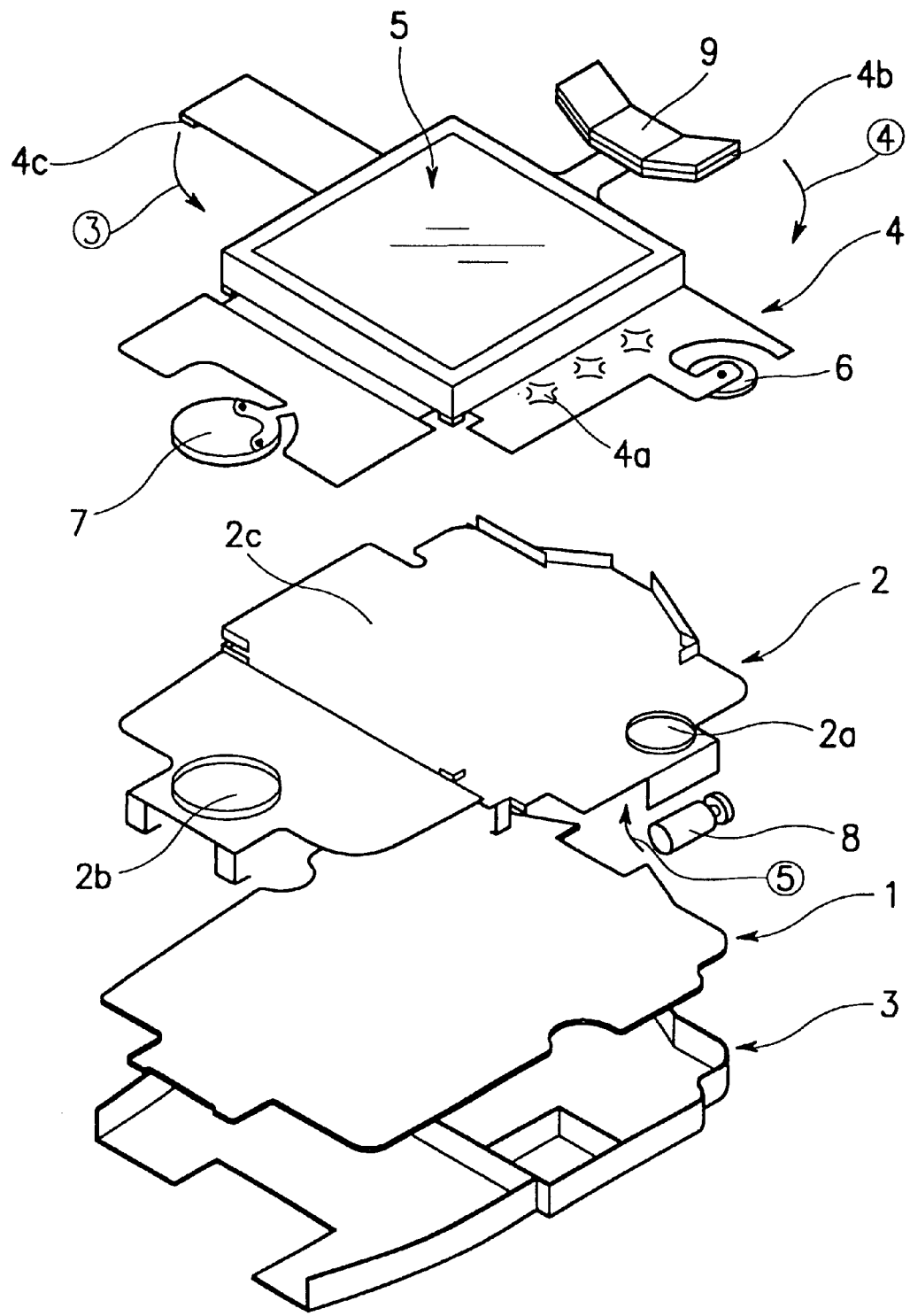
FIG. 11 is an exploded perspective view illustrating an RF board assembly of the watch type portable radiotelephone in accordance with a preferred embodiment of the present invention.

As shown in FIG. 11, RF board assembly 70, which is supported in body element 100 (FIG. 1), includes an RF board 1, upper and lower shield covers 2 and 3 which are assembled to an upper surface and a lower surface of the RF board 1, respectively, and a second flexible printed circuit 4 which is seated on the upper shield cover 2. An LCD 5 is mounted on second flexible printed circuit 4.

A speaker 7 and a microphone 6 are positioned on flexible printed circuit 4. Also, at least one key input section 4*a* and/or 4*b* is provided on flexible printed circuit 4. When flexible printed circuit 4 and upper shield cover 2 are assembled with each other, first and second seating parts 2*a* and 2*b*, on which microphone 6 and speaker 7 are seated are located at predetermined positions on upper shield cover 2. A vibration motor 8 is disposed below upper shield cover 2. A third seating part 2*c*, in which flexible printed circuit 4 is seated, is defined at a center portion of upper shield cover 2.

As described above, at least one key input section is mounted to flexible printed circuit 4. A first key input section 4*a* is positioned on top end 101*a* of body element 100, and a second key input section 4*b* is positioned on side end 102*a* of body element 100. A metal shield key plate 9 can be installed on second key input section 4*b* to provide additional support to second key input section 4*b*. An interface plug 4*c* for electrically connecting flexible printed circuit 4 and RF board 1 with each other is mounted to flexible printed circuit 4.

Each of key input sections 4*a* and 4*b* comprises a key (see FIG. 1) which is exposed to the outside of body element 100 and a metal dome which issues a data input instruction in response to operation of key input sections 4a and 4b. It is preferred that the metal dome is attached to flexible printed circuit 4.

Arrow ③ indicates the direction by which interface plug 4c, which is installed on flexible printed circuit 4, is bent to be connected to RF board 1. An arrow ④ indicates the direction by which the metal dome is bent to be mated with the key positioned on side end 102a of body element 100. The arrow ⑤ indicates the direction by which vibration motor 8 is mounted at the predetermined position to upper shield cover 2.

Due to the manner in which RF board 1, upper and lower shield covers 2 and 3, flexible printed circuit 4 and the LCD 5 are assembled, i.e., they are stacked one upon another, the watch type portable radiotelephone can be reduced in size and the structure of the body element can be simplified. The RF board assembly of the present invention is suitable for mass production and improves assemblability and reliability of the end product.

Figure 12:
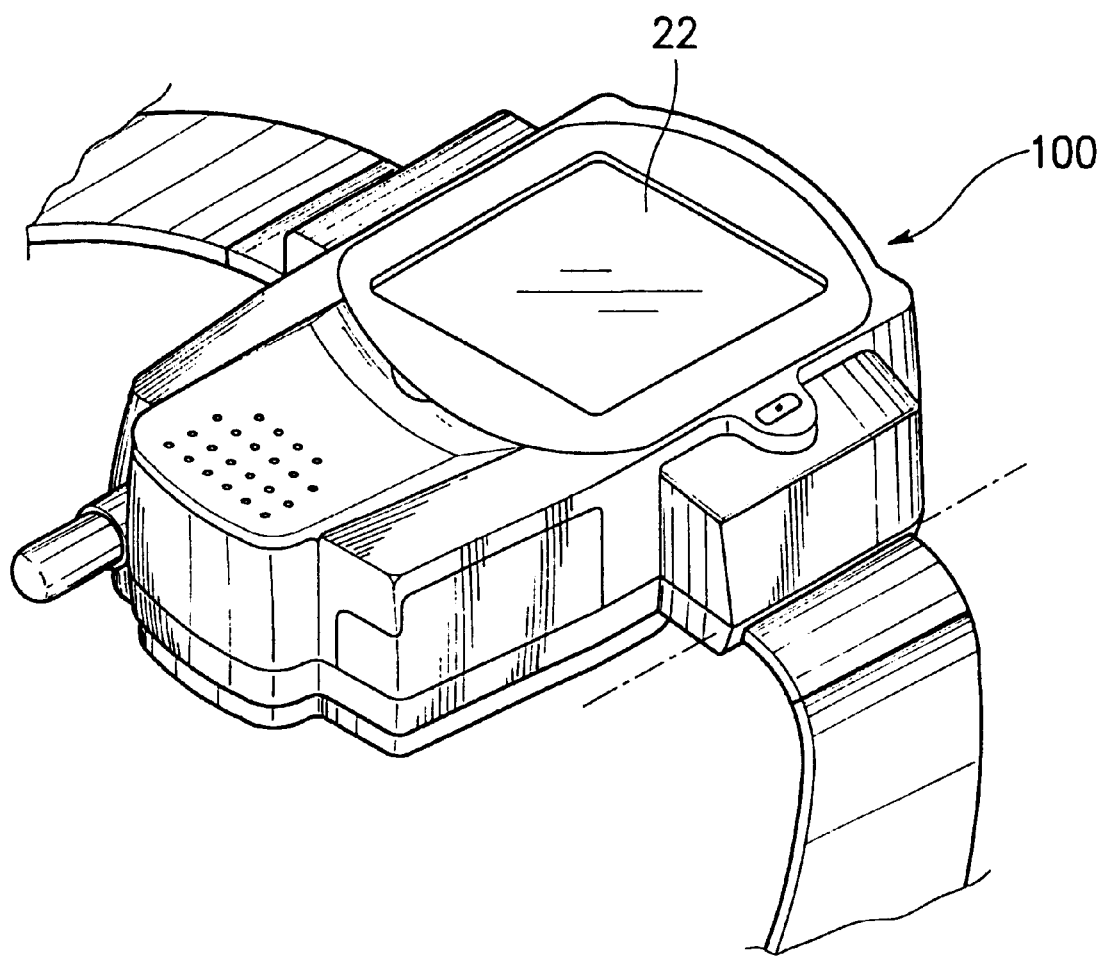
FIG. 12 is a perspective view of another embodiment of the presently disclosed watch type portable radiotelephone.

In the watch type portable radiotelephone according to a second embodiment of the present invention shown in FIG. 12, a touch pen (not shown) is used as data input means, and a touch panel 22, which is mounted to the body element, is used as data output means which responds to operation of the data input means. Since the remaining structure of the second embodiment is similar to that of the first embodiment, further explanations thereof will be omitted.

Alternately, the data input means need not to be limited to a touch pen, but rather, data can be inputted using a mechanism which has the same functionality as a touch pen, e.g., the finger, as occasion demands.

As a key input section according to the present invention, a sliding key input section having a doctor switch which is disposed therein, can be used to assure user convenience. The sliding key input section is waterproof.

Figure 13:
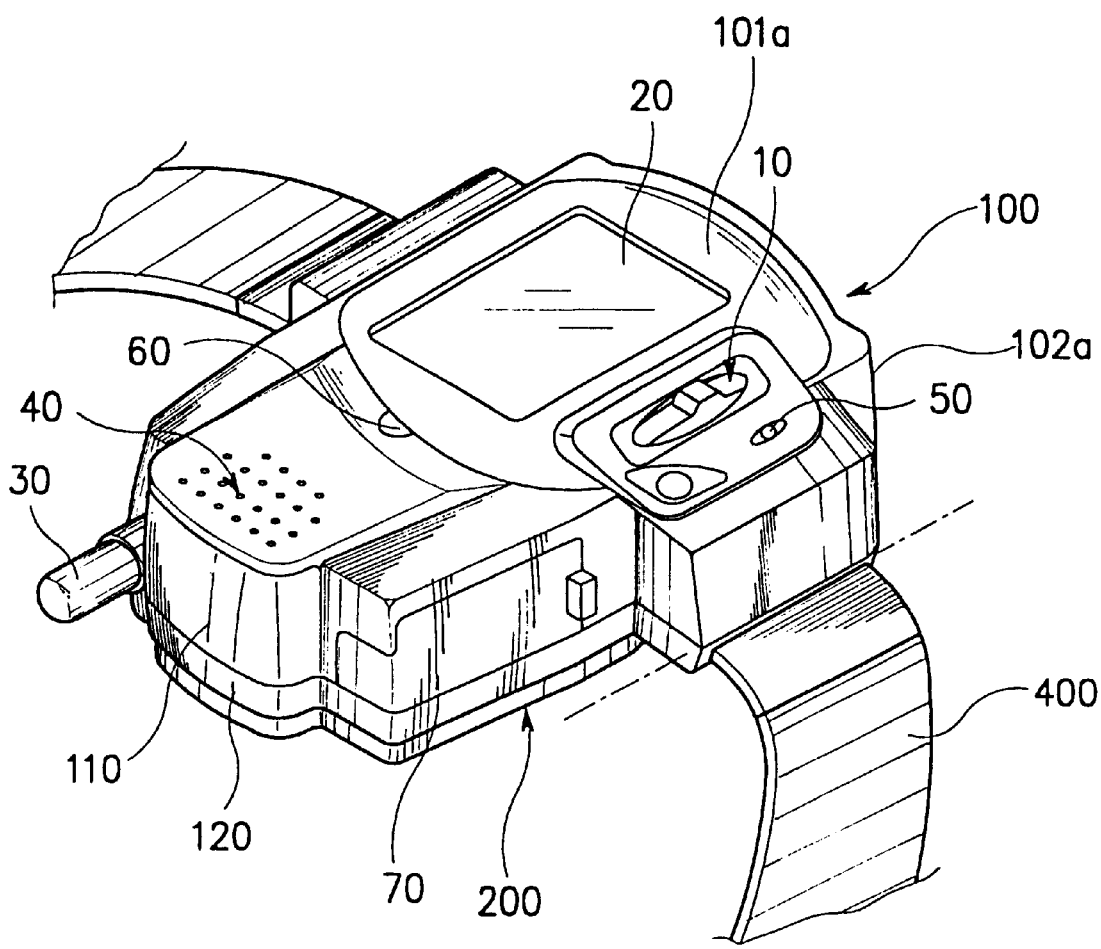
FIG. 13 is a perspective view of yet another embodiment of the presently disclosed watch type portable radiotelephone.
Figure 14:
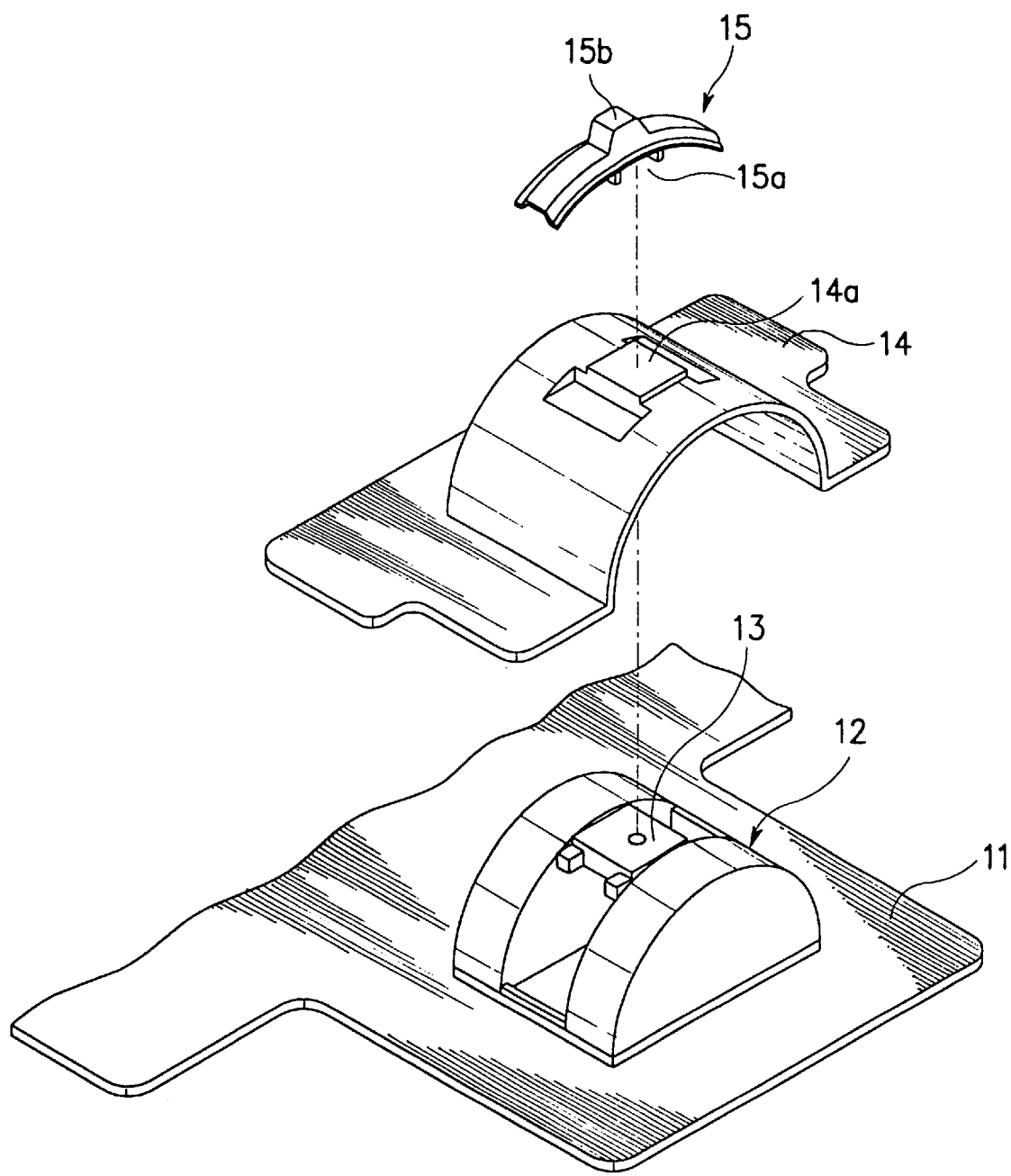
FIG. 14 is a partial exploded perspective view illustrating a sliding key assembly of the watch type portable radiotelephone shown in FIG. 13.
Figure 15:
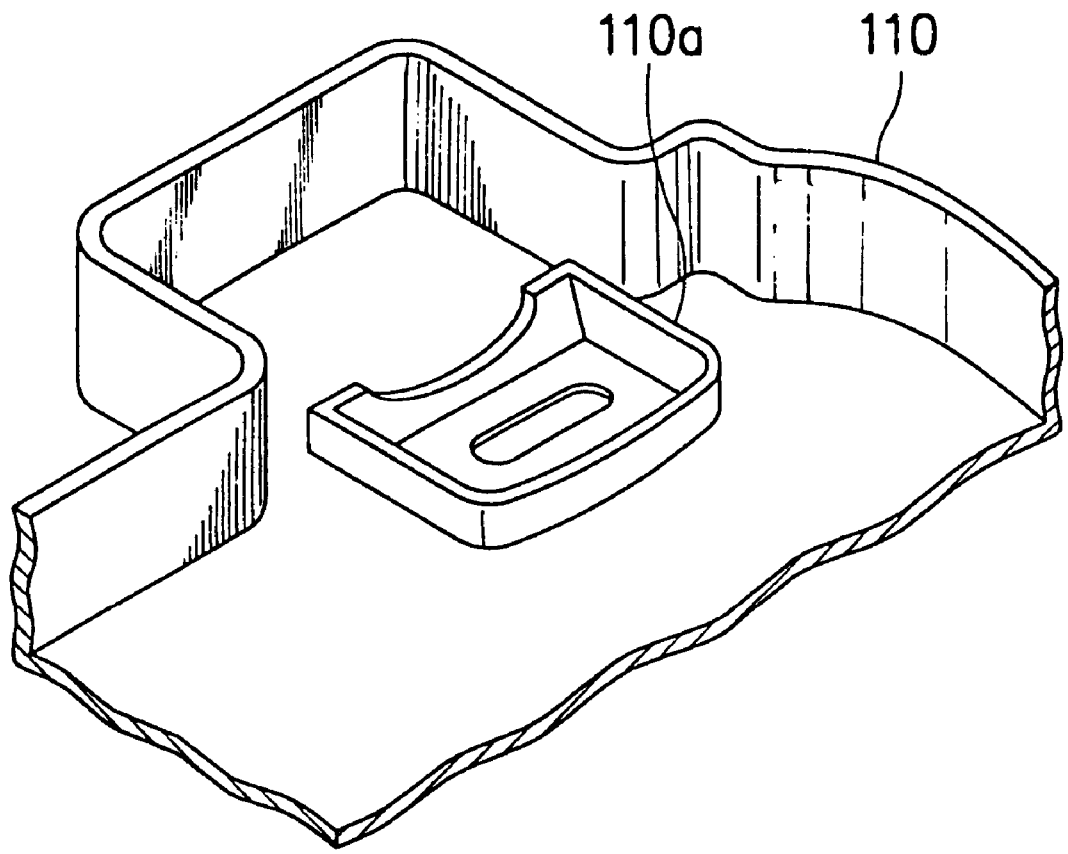
FIG. 15 is a partial perspective view illustrating a rectangular rib formed on an upper case frame of the watch type portable radiotelephone shown in FIG. 13.

Referring to FIGS. 13–15, sliding key assembly 10 includes a printed circuit board 11 which is secured to lower case frame 120 of body element 100, a sliding key 12 which is fixed onto printed circuit board 11 and has a doctor switch 13 capable of being moved left and right, waterproofing means which is formed such that it covers an upper surface of sliding key 12, a sliding key button 15 which is positioned above the waterproofing means for moving doctor switch 13 of sliding key 12, and upper case frame 110 which is coupled to lower case frame 120 such that it allows a portion of the sliding key button 15 to project upward therethrough.

The waterproofing means may include a slide key gel 14 and a flexible rubber member (not shown). Slide key gel 14 and the flexible rubber member can be installed such that they cover the entire upper surface of sliding key 12. An upwardly protruding part 14a, defining an engaging space into which doctor switch 13 is engaged, is formed at a suitable position in slide key gel 14.

Sliding key button 15, which is positioned above slide key gel 14, has a fourth seating part 15a which is formed on a lower surface thereof. Doctor switch 13, which is engaged into the engaging space defined by the protruding part 14a of slide key gel 14, is seated on fourth seating part 15a such that it can be moved left and right. On a middle portion of an upper surface of sliding key button 15, there is formed a knob part 15b for being manipulated by the user.

A rectangular rib 110a is formed on a lower surface of upper case frame 110 such that it projects downward. Rectangular rib 110a effects waterproofing of the structure by pressing slide key gel 14 against sliding key 12 when upper case frame 110 is coupled to lower case frame 120 of body element 100.

Sliding key 12 having doctor switch 13, which is formed to have a predetermined pattern, is fixed onto printed circuit board 11 which is secured to lower case frame 120. Slide key gel 14 covers the entire upper surface of sliding key 12. When assembled, doctor switch 13 is positioned in the engaging space which is defined on the lower surface of protruding part 14a of slide key gel 14.

Sliding key button 15 is mounted onto slide key gel 14. Protruding part 14a of slide key gel 14 is seated onto fourth seating part 15a which is formed on the lower surface of sliding key button 15. If the knob part 15b is moved left and right, protruding part 14a of slide key gel 14 and doctor switch 13 are moved together in an integral manner.

Upper case frame 110 is mounted on sliding key button 15. Knob part 15b of sliding key button 15 projects upwardly through upper case frame 110, to be easily and conveniently manipulated by the user. When upper case frame 110 is assembled to lower case frame 120, rectangular rib 110a, which is formed on the lower surface of upper case frame 110, applies a predetermined pressure onto the upper surface of slide key gel 14. Consequently, even if water leaks into body element 100 through the cutout portion formed in upper case frame 110 for allowing the knob part 15b of the sliding key button 15 to project upward, rectangular rib 110a provides the waterproofing function.

Figure 16:
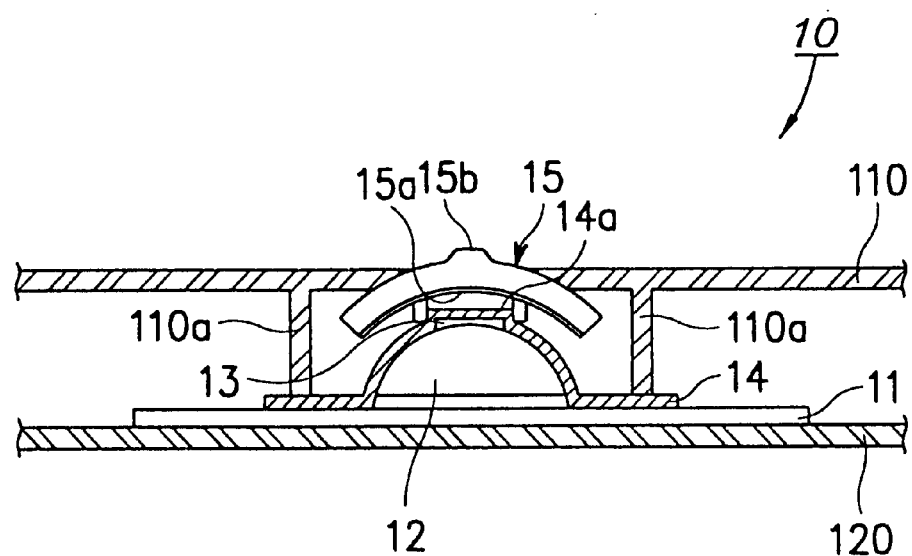
FIG. 16 is a side cross-sectional view of the sliding key assembly shown in FIG. 14.
Figure 17:
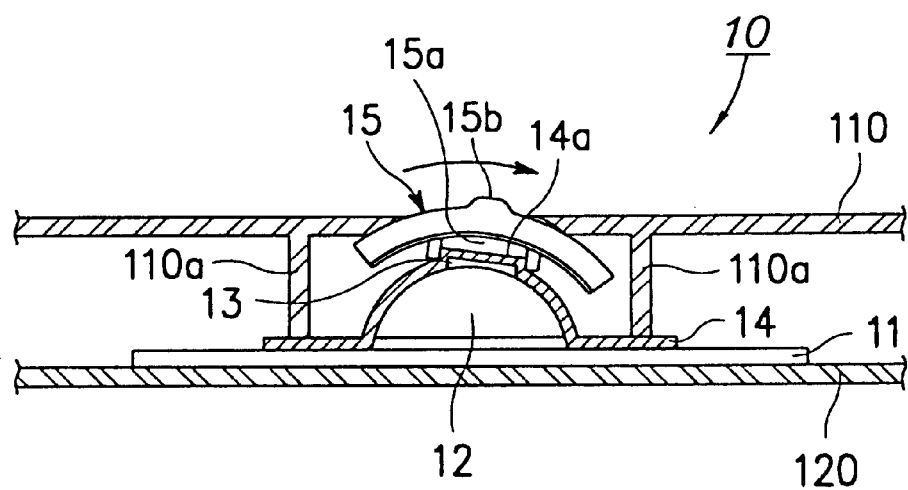
FIG. 17 is a side cross-sectional view of the sliding key assembly wherein a sliding key button has been moved to a side.

FIGS. 16 and 17 illustrate a third preferred embodiment of the invention. In this embodiment, if sliding key button 15 is moved to the left or to the right, doctor switch 13 and protruding part 14a of slide key gel 14, which is positioned between doctor switch 13 and sliding key button 15, are moved together in an integral manner.

As described above, the watch type portable radiotelephone according to the present invention provides advantages in that, since it can be worn around the wrist, it is portable and it is of reduced size. Further, it is unlikely that it will be dropped and damaged. Moreover, due to the fact that a battery pack is locked to and unlocked from a body element in a vertical direction, a stable connection structure which is waterproof and reliable is provided.

While this invention has been described in connection with what is presently considered to be the most practical and preferred embodiments, it is to be understood that the invention is not limited to the disclosed embodiments, but, on the contrary, it is intended to cover various modifications within the spirit and scope of the appended claims.

What is claimed is:

1. A portable radiotelephone comprising:
   a body element including upper and lower case frames;
   a battery pack for supplying power to the body element;
   a holding part formed integrally with the lower case frame of the body element, the holding part at least partially defining a receiving space configured for receiving the battery pack from a direction substantially perpendicular to the lower case frame;
   a locking projection positioned to lock and unlock the battery pack to and from the body element;
   a battery connection spring assembly for making an electrical connection between the body element and the battery pack; and
   a wristband connected to the body element for enabling the portable radiotelephone to be worn around the wrist.

2. A portable radiotelephone comprising:
   a body element including upper and lower case frames, the body element having data input means, an LCD unit, an antenna unit electrically connected to a receiver and a transmitter, a speaker unit, and a microphone unit;
   a holding part formed integrally with the lower case frame of the body element and at least partially defining a receiving space configured to receive a battery pack for supplying power to the body element;

a first connection section supported by the lower case frame of the body element, the first connection section being connected with an RF board assembly;

a first fixing section formed on the lower case frame configured to receive the first connection section;

a second connection section positioned on the battery pack to be connected with the first connection section;

a second fixing section found on the battery pack configured to receive the second connection section;

an electrical connection between the second connection section and the battery pack; and a wristband connected to the body element for enabling the portable radiotelephone to be worn around the wrist.

3. The portable radiotelephone as claimed in claim 2, further including a battery pack, and wherein the connection means comprises:

a flexible printed circuit for electrically connecting the second connection section and a battery cell of the battery pack, with each other.

4. The portable radiotelephone as claimed in claim 2, wherein the first connection section includes an electrically conductive battery contact spring assembly.

5. The portable radiotelephone as claimed in claim 4, wherein the battery contact spring assembly comprises:

a conductive housing;

a pair of conductive connection terminals disposed in the conductive housing; and a conductive coil spring having first and second ends which are brought into close contact with each of the pair of conductive connection terminals, respectively.

6. The portable radiotelephone as claimed in claim 2, wherein the second connection section comprises:

a battery contactor; and a battery contactor tail connected to the battery contactor in a point to point contact pattern.

7. The portable radiotelephone as claimed in claim 6, wherein the battery contactor is formed with a recess for maximizing contact with the first connection section.

8. The portable radiotelphone as claimed in claim 2, wherein the first and second fixing sections include first and second fixing ribs, respectively.

9. The portable radiotelephone as claimed in claim 2, wherein the data input means is selected from the group consisting of at least one key and at least one voice recognition unit.

10. The portable radiotelephone as claimed in claim 2, wherein the data input means includes a waterproof sliding key input section.

11. The portable radiotelephone as claimed in claim 10, wherein the sliding key input section comprises:

a sliding key having a doctor switch which is positioned on a printed circuit board;

a sliding key button disposed on the doctor switch of the sliding key and having a knob part;

waterproof structure positioned between the sliding key and the sliding key button; and an abutment positioned on a lower surface of the lower case frame for engaging the waterproof structure.

12. The portable radiotelephone as claimed in claim 11, wherein the waterproof structure is selected from one of a slide key gel and a flexible rubber member.

13. The portable radiotelephone as claimed in claim 12, wherein the waterproof structure moves together with the sliding key button and the doctor switch of the sliding key.

14. The portable radiotelephone as claimed in claim 2, further including a battery pack, and wherein the holding port includes:

a recess; and the battery pack includes a holding projection configured to be inserted into the recess when the battery pack is locked to the body element.

15. A portable radiotelephone comprising:

data input means;

a battery pack;

a body element including upper and lower case frames, the body element having a touch panel outputting data inputted by an operation of the data input means, an antenna unit electrically connected to a receiver and a transmitter, a speaker unit, and a microphone unit;

a holding part formed integrally with the lower case frame of the body element, the holding part at least partially defining a receiving space configured to receive the battery pack, the holding part being positioned to retain the battery pack within the receiving space;

locking means for locking and unlocking the battery pack to and from the body element in a direction perpendicular to a plane of the body element;

a first connection section supported by the lower case frame of the body element, the first connection section being connected with an RF board assembly;

a first fixing section formed on the lower case frame, the first fixing section being configured to receive the first connection section in a waterproof manner;

a second connection section positioned on the battery pack to be connected with the first connection section;

a second fixing section on the battery pack, the second fixing section being configured to receive the second connection section in a waterproof manner;

a flexible printed circuit for electrically connecting the second connection section and the battery pack; and a wrist band connected to the body element for enabling the portable radiotelephone to be worn around the wrist.

16. The portable radiotelephone as claimed in claim 15, wherein the data input means includes one of a touch pen and a voice recognition unit.

17. The portable radiotelephone as claimed in claim 15, wherein the holding part includes a recess and the battery pack includes a holding projection positioned to be inserted into the recess when the battery pack is locked to the body element.

18. The portable radiotelephone as claimed in claim 15, wherein the first connection section is a conductive battery contact spring assembly.

19. The portable radiotelephone as claimed in claim 18, wherein the battery contact spring assembly comprises:

a conductive housing;

a pair of conductive connection terminals disposed in the conductive housing; and a conductive coil spring having first and second ends which are brought into close contact with each of the pair of conductive connection terminals, respectively.

20. The portable radiotelephone as claimed in claim 15, wherein the second connection section comprises;

a battery contactor; and a battery contactor tail connected to the battery contactor in a point to point contact pattern.

21. The portable radiotelephone as claimed in claim 20, wherein the battery contactor is formed with a recess for maximizing contact with the first connection section.

22. The portable radiotelephone as claimed in claim 15, wherein the first and second fixing sections are a pair of fixing ribs, respectively.

* * * * *